(12) United States Patent
Fiechter et al.

(10) Patent No.: US 11,623,401 B2
(45) Date of Patent: Apr. 11, 2023

(54) ADDITIVE MANUFACTURED STRUCTURE HAVING A PLURALITY OF LAYERS IN A STACKING DIRECTION THAT DEFINE A PLURALITY OF INTERFACES AND METHOD FOR MAKING THE SAME

(71) Applicant: RapidFlight Holdings, LLC, Manassas, VA (US)

(72) Inventors: Alexis Fiechter, Mesa, AZ (US); Kyle Rowe, Knoxville, TN (US); Charles C. Hill, Topton, NC (US); Robert Bedsole, Knoxville, TN (US); David Riha, Knoxville, TN (US)

(73) Assignee: RapidFlight Holdings, LLC, Manassas, VA (US)

( * ) Notice: Subject to any disclaimer, the term of this patent is extended or adjusted under 35 U.S.C. 154(b) by 186 days.

(21) Appl. No.: 17/193,764

(22) Filed: Mar. 5, 2021

(65) Prior Publication Data

US 2021/0187851 A1 Jun. 24, 2021

Related U.S. Application Data

(63) Continuation of application No. 16/186,212, filed on Nov. 9, 2018, now Pat. No. 10,967,576.

(Continued)

(51) Int. Cl.
*B29C 64/30* (2017.01)
*B29C 64/00* (2017.01)
(Continued)

(52) U.S. Cl.
CPC ............ *B29C 64/30* (2017.08); *B29C 64/00* (2017.08); *B29C 64/118* (2017.08); *B29C 70/56* (2013.01);
(Continued)

(58) Field of Classification Search
None
See application file for complete search history.

(56) References Cited

U.S. PATENT DOCUMENTS 5,593,633 A 1/1997 Dull et al.
5,939,008 A 8/1999 Comb et al.
(Continued)

FOREIGN PATENT DOCUMENTS

CN 106626369 A 5/2017
CN 107097424 A 8/2017
(Continued)

OTHER PUBLICATIONS

WO, International Search Report and Written Opinion, International Application No. PCT/US2018/060127, dated Feb. 18, 2019.
(Continued)

*Primary Examiner* — Octavia Davis Hollington
*Assistant Examiner* — Jermaine L Jenkins
(74) *Attorney, Agent, or Firm* — Polsinelli PC

(57) ABSTRACT

An additive manufactured structure and methods for making and using same. The structure includes a plurality of layers stacked in a stacking direction. The structure further includes at least one reinforcement structure affixed to the layers and extending at least partially in the stacking direction. The reinforcement structure can hold the layers together to stiffen and strengthen the structure. Mechanical strength of the structure in the stacking direction can advantageously be improved. Shape and spatial distribution of the reinforcement structure can be customized and adapted to the geometry of the layers to enhance strengthening effect. The reinforcement structure can be tension free or have a compressive stress induced by a preload applied during manufacturing. The compressive stress can be adjusted dynamically via a sensor. The structure and methods pro- (Continued)

vide, among other things, novelty for addressing the inherent weaknesses in parts created by large-scale extrusion deposition processes.

19 Claims, 12 Drawing Sheets

Related U.S. Application Data

(60) Provisional application No. 62/666,603, filed on May 3, 2018, provisional application No. 62/584,628, filed on Nov. 10, 2017.

(51) Int. Cl.
| | | |
|---|---|---|
| *B33Y 10/00* | (2015.01) | |
| *B33Y 40/00* | (2020.01) | |
| *B29C 64/118* | (2017.01) | |
| *G01L 1/00* | (2006.01) | |
| *B29K 55/02* | (2006.01) | |
| *B29C 70/56* | (2006.01) | |
| *B33Y 70/10* | (2020.01) | |
| *B29K 105/12* | (2006.01) | |
| *B29K 307/04* | (2006.01) | |

(52) U.S. Cl.
CPC .............. *B33Y 10/00* (2014.12); *B33Y 40/00* (2014.12); *B33Y 70/10* (2020.01); *G01L 1/00* (2013.01); *B29K 2055/02* (2013.01); *B29K 2105/12* (2013.01); *B29K 2307/04* (2013.01)

(56) References Cited

U.S. PATENT DOCUMENTS

| | | | |
|---|---|---|---|
| 7,056,567 B2 | 6/2006 | O'Neill et al. | |
| 7,127,309 B2 | 10/2006 | Dunn et al. | |
| 9,399,320 B2 | 7/2016 | Johnson et al. | |
| 9,815,268 B2 | 11/2017 | Mark et al. | |
| 10,286,599 B2 * | 5/2019 | Jones | B33Y 70/10 |
| 10,322,530 B2 | 6/2019 | Kawabe | |
| 10,369,742 B2 | 8/2019 | Scribner et al. | |
| 10,442,003 B2 * | 10/2019 | Symeonidis | B23K 37/06 |
| 10,967,576 B2 * | 4/2021 | Fiechter | B33Y 10/00 |
| 2005/0208168 A1 | 9/2005 | Hickerson et al. | |
| 2011/0241947 A1 | 10/2011 | Scott et al. | |
| 2012/0115379 A1 | 5/2012 | Kim | |
| 2012/0323345 A1 | 12/2012 | Jonas et al. | |
| 2014/0333011 A1 | 11/2014 | Javidan et al. | |
| 2015/0024169 A1 | 1/2015 | Martin | |
| 2015/0048555 A1 | 2/2015 | Nagasaki et al. | |
| 2015/0061170 A1 | 3/2015 | Engel et al. | |
| 2015/0291921 A1 | 10/2015 | Rives | |
| 2016/0039194 A1 | 2/2016 | Cable | |
| 2016/0136895 A1 | 5/2016 | Beyer et al. | |
| 2016/0176118 A1 | 6/2016 | Reese et al. | |
| 2016/0185041 A1 | 6/2016 | Lisagor et al. | |
| 2016/0193791 A1 | 7/2016 | Swanson et al. | |
| 2016/0207263 A1 | 7/2016 | Gordon | |
| 2016/0221261 A1 | 8/2016 | Yamamoto et al. | |
| 2016/0332382 A1 | 11/2016 | Coward et al. | |
| 2016/0332387 A1 | 11/2016 | Jondal et al. | |
| 2017/0036403 A1 | 2/2017 | Ruff et al. | |
| 2017/0037674 A1 | 2/2017 | Hooper et al. | |
| 2017/0073280 A1 | 3/2017 | Jones | |
| 2017/0144242 A1 | 5/2017 | McQueen et al. | |
| 2017/0182562 A1 | 6/2017 | Das et al. | |
| 2017/0182712 A1 | 6/2017 | Scribner et al. | |
| 2017/0217105 A1 | 8/2017 | Taniuchi | |
| 2017/0252980 A1 | 9/2017 | Kelly et al. | |
| 2017/0297320 A1 | 10/2017 | Swanson | |
| 2017/0305034 A1 | 10/2017 | Grivetti et al. | |
| 2017/0312986 A1 | 11/2017 | Qian | |
| 2018/0009172 A1 | 1/2018 | Amba et al. | |
| 2018/0099452 A1 | 4/2018 | Ochi et al. | |
| 2018/0117833 A1 | 5/2018 | Nagahari et al. | |
| 2018/0154441 A1 | 6/2018 | Miller et al. | |
| 2018/0182532 A1 | 6/2018 | Stahr et al. | |
| 2018/0207863 A1 | 7/2018 | Porter et al. | |
| 2018/0311891 A1 | 11/2018 | Duty et al. | |
| 2019/0047221 A1 | 2/2019 | Baltes | |
| 2019/0077081 A1 | 3/2019 | Susnjara et al. | |
| 2019/0092978 A1 | 3/2019 | Ogino et al. | |
| 2019/0224909 A1 | 7/2019 | Riha et al. | |
| 2019/0240934 A1 | 8/2019 | Prins et al. | |
| 2020/0024414 A1 | 1/2020 | Ichino et al. | |
| 2021/0039315 A1 | 2/2021 | Ciscon et al. | |
| 2022/0040920 A1 | 2/2022 | Kunc et al. | |

FOREIGN PATENT DOCUMENTS

| | | |
|---|---|---|
| CN | 206884186 U | 1/2018 |
| EP | 3238865 A1 | 11/2017 |
| FR | 2 998 209 A1 | 5/2014 |
| JP | 2012024920 A | 2/2012 |
| JP | 2018062062 B2 | 4/2015 |
| JP | 2015131469 A | 7/2015 |
| JP | 2017171958 A | 9/2017 |
| JP | 2018034336 A | 3/2018 |
| KR | 10-2016-0128657 A | 11/2016 |
| KR | 10-2017-0004469 A | 1/2017 |
| WO | 99/37454 A1 | 7/1999 |
| WO | WO 2013/136096 A1 | 9/2013 |
| WO | 2015/049834 A1 | 4/2015 |
| WO | 2016136166 A1 | 9/2016 |
| WO | 2017/049155 A1 | 3/2017 |
| WO | 2017078168 A1 | 5/2017 |
| WO | 2017106965 A1 | 6/2017 |
| WO | 2017/159349 A1 | 9/2017 |
| WO | 2017/172574 A1 | 10/2017 |
| WO | 2017180958 A2 | 10/2017 |

OTHER PUBLICATIONS

Chinese language 2nd Office Action, with English language translation, dated Dec. 1, 2022 for CN patent application No. CN 201980027421.4 (15 pages).
International Search Report and Written Opinion, dated Nov. 8, 2019, for PCT/US2019/046191 (13 pages).
Chinese language 2nd Office Action dated Aug. 12, 2022 for CN 20198009811.7 (6 pages).
Japanese-language Office Action, and English-language translation, for JP patent application 2020-261590 dated Dec. 8, 2021 (9 pages).
Chinese language 2nd Office Action dated Jan. 5, 2022 for CN 201980014512.4 (3 pages).
Chinese language 1st Office Action dated Jun. 25, 2021 for CN 201980014512.4 (10 pages).
Canadian Examiner's Report dated Feb. 16, 2022 for CA patent application No. CA3100846 (4 pages).
Chinese language 1st Office Action and Search Report dated Feb. 8, 2022 for CN 201980038575.3 (7 pages).
Korean language Decision of First Refusal, with English language translation, dated Apr. 27, 2022 for 10-2020-7034143 (7 pages).
Chinese language 1st Office Action dated Nov. 17, 2021 for CN 20198009811.7 (8 pgs ).
International Search Report and Written Opinion, dated Jul. 31, 2019, for PCT/US2019/018806 (11 pgs.).
International Search Report and Written Opinion for PCT/US2019/046191 dated Nov. 8, 2019 (13 pages).
Chinese language 1st Office Action dated Nov. 21, 2021 for CN 201980027421 4 (11 pages).
International Search Report and Written Opinion for PCT/US2019/028775 dated Jan. 17, 2020 (37 pages).
Bales et al., "Design and Use of a Penetrating Deposition Nozzle for Z-Pinning Additive Manufacturing," Oak Ridge National Lab. (ORNL), Oak Ridge, TN (United States), 2022 (20 pages).
Chinese language 2nd Office Action, with English language translation, dated Dec. 1, 2022 for CN patent application No. CN 201980038575.3 (8 pages).

(56) References Cited

OTHER PUBLICATIONS

International Search Report and Written Opinion, dated Sep. 3, 2019, for PCT/US2019/036603 (15 pages).
Korean language Office Action, and English language translation, dated Oct. 26, 2021 for KR patent application No. 10-2020-7034143 (14 pages).
Korean language Office Action, and English language translation, dated Jun. 24, 2021 for KR patent application No. 10-2020-7027227 (3 pages).

* cited by examiner

ADDITIVE MANUFACTURED STRUCTURE HAVING A PLURALITY OF LAYERS IN A STACKING DIRECTION THAT DEFINE A PLURALITY OF INTERFACES AND METHOD FOR MAKING THE SAME

RELATED APPLICATIONS

This application is a continuation of and claims priority to co-pending U.S. patent application Ser. No. 16/186,212, filed on Nov. 9, 2018, which claims priority to U.S. Provisional Application Ser. No. 62/584,628, filed on Nov. 10, 2017 and U.S. Provisional Application Ser. No. 62/666,603, filed on May 3, 2018. The disclosures of the co-pending United States patent application and the provisional applications are hereby incorporated herein by reference in their entirety and for all purposes.

FIELD

The disclosed embodiments relate generally to additive manufacturing and more particularly, but not exclusively, to additively manufactured structures and methods for making the same.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the first 3D printed articles were generally models, the industry is quickly advancing by creating 3D printed articles that may be functional parts in more complex systems, such as hinges, tools, and structural elements. Many of these parts may bear a mechanical load, and the stronger the load-bearing capabilities of the parts, the more generalized functional applications of the parts may be.

In typical additive manufacturing processes, a 3D object is created by forming layers of material under computer control. An arising mechanical challenge for more advanced 3D printed articles may be delamination due to poor surface adhesion between layers of the formed 3D printed article, especially when plastics are used in formation.

Additive manufacturing for making a 3D article on a large scale (typically with at least one dimension greater than 5 feet) can be referred to as large-scale additive manufacturing. A system (or technique) for large scale additive manufacturing can be referred to as large scale additive manufacturing system (or technique). Exemplary large scale additive manufacturing systems include, for example, the Big Area Additive Manufacturing (BAAM) 100 ALPHA available from Cincinnati Incorporated located in Harrison, Ohio, or the Large Scale Additive Manufacturing (LSAM) machine available from Thermwood Corporation located in Dale, Ind. An exemplary system that uses extrusion deposition for large scale additive manufacturing includes the BAAM 100 ALPHA.

Large-scale additive manufacturing has recently become an area of greater research, use, and technology advancement because of improvements in material properties and increased needs of customized large structures. For example, Local Motors located in Phoenix, Ariz., was the first to use large-scale additive manufacturing, or large-scale extrusion deposition, to print a vehicle. However, large-scale additive manufacturing also faces great challenges that cannot be resolved by directly adopting technology used in smaller-scale additive manufacturing. One of the challenges is interface adhesion between layers of a printed article.

Although smaller-scale additive manufacturing may alleviate the problem of interface adhesion, the problem of poor interface adhesion is especially severe and presents unique challenges in large-scale additive manufacturing. For example, in a large-scale extrusion deposition process, polymer beads are stacked or layered. During the large-scale extrusion deposition process, time for printing each layer is longer, so the surface of a previously-deposited layer may have a longer time to cool before deposition of a new layer on the surface, which leads to weaker bonding and adhesion between layers. The weak interface provides an unobstructed path for material defects, such as cracks, to propagate and further weaken the final part (or object). Mechanical properties in this layering direction are often significantly lower than those in the printing direction. In large-scale additive manufacturing, materials typically have very high mechanical strength in the x-direction. Thus, in comparison, material weakness in the z-direction becomes a more severe problem.

Furthermore, large-scale additive manufacturing can be used for making structural members, such as a body or framework of a vehicle or an architectural structure. Requirements of material strength for those structural members are high. In contrast, smaller-scale additive manufacturing produces smaller-scale parts which are not typically used as structural members, and the level of reinforcement necessary in smaller-scale additive manufacturing is typically minimal.

In addition, methods for improving interface properties for smaller-scale additive manufacturing often do not apply to large-scale additive manufacturing. For example, methods of reinforcement or improvement of interlaminar adhesion for smaller-scale additive manufacturing, such as stress relief through thermal cycling and hot isostatic pressing, can be very energy intensive and cannot be used for large-scale additive manufacturing in practice. Take thermal cycling as an example. In smaller-scale additive manufacturing, a small amount of energy is needed for a part with a volume on the order of one cubic foot. But in large-scale additive manufacturing, energy can be needed by a part with a volume on the order of one thousand cubic feet, which is a significant increase in cost and effort. Moreover, methods such as thermal cycling and hot isostatic pressing require ovens or equipment that are commensurate in size to the printed part. Ovens or equipment used for large-scale additive manufacturing will thus be large, costly, and energy intensive, and the printed part is difficult to handle for such processes.

To improve mechanical properties of the printed part in large-scale additive manufacturing, threaded rods can be inserted through the z-direction of the part and apply a compressive load to the layers. The threaded rod does not make contact with any of the polymer layers that the threaded rod passes through. The threaded rods can distribute contact stresses, and the tension in the threaded rods can impose a compressive stress in the layer direction. However, being rigid and uniaxial-shaped, threaded rods can only provide uniaxial strengthening in the z-direction and cannot provide reinforcement out of z-direction. For parts with complex geometry, reinforcement in multiple directions and tailored to specific geometry of the part is desirable for strengthening in the stacking direction.

Therefore, large-scale additive manufacturing introduces interface problems that are different from and greater than those problems in smaller-scale additive manufacturing. Further, any methods for solving interface problems in smaller-scale additive manufacturing may not be effective or practical in large-scale additive manufacturing.

In view of the foregoing, there is a need for improvements and/or alternative or additional solutions to improve mechanical properties in the stacking direction of the formed 3D printed article.

Figure 1:
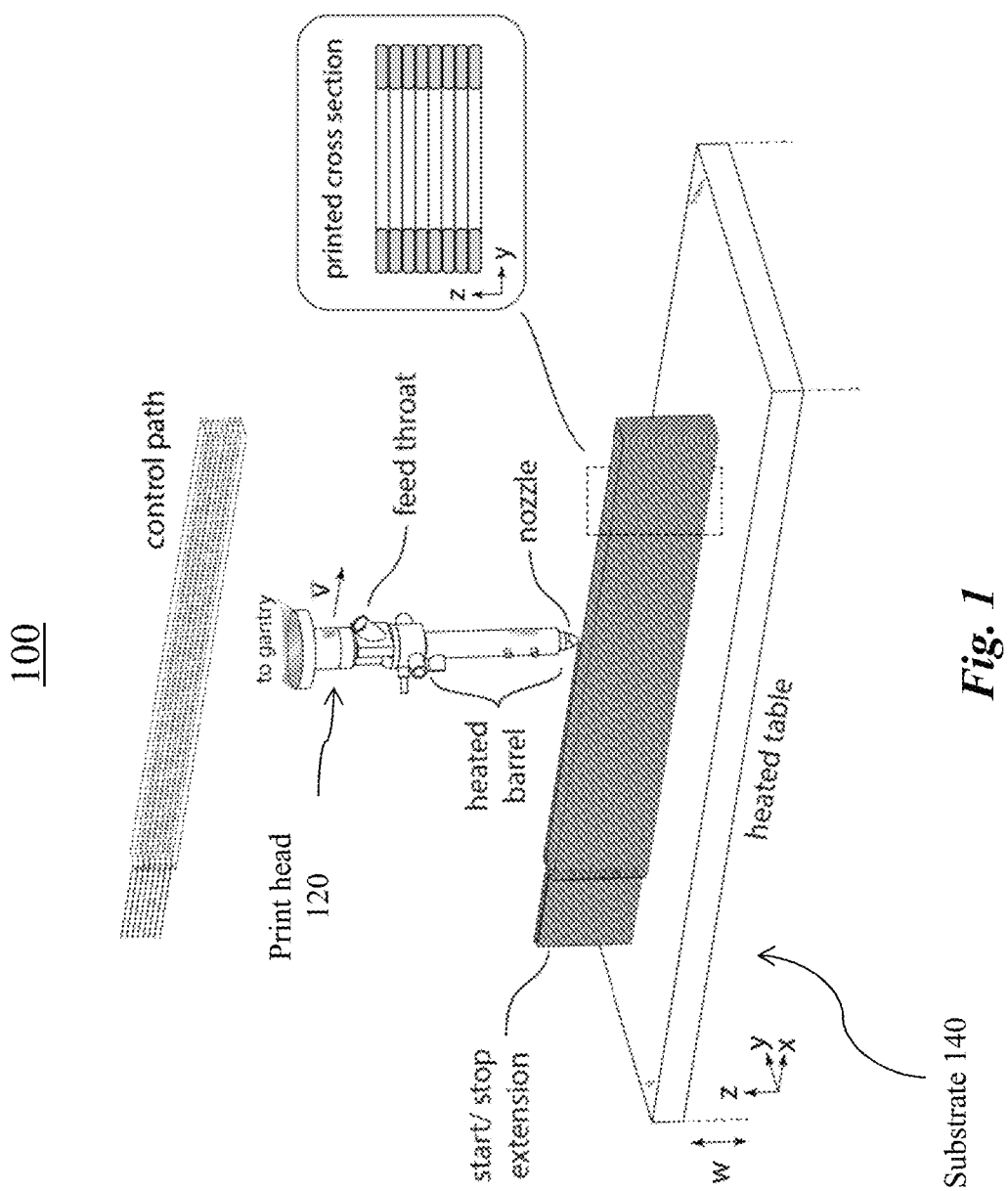
FIG. 1 is an exemplary diagram illustrating one embodiment of a system for additive manufacturing.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

FIG. 1 shows an exemplary system 100 for additive manufacturing. The system 100 can print 3D articles via extrusion deposition (or material extrusion). A print head 120 is shown as including a nozzle configured to deposit one or more polymer layers onto a substrate 140 to form the 3D printed article. The substrate 140 can include a heated table and/or previously deposited layers. The stacking direction of the layers is z-direction and the printing direction includes the x-direction.

Although FIG. 1 shows additive manufacturing as being implemented by the system 100 using extrusion deposition, any other systems or processes for implementing additive manufacturing can be used with the present disclosure. Exemplary processes for additive manufacturing can include binder jetting, directed energy deposition, material jetting, powder bed fusion, sheet lamination, vat photopolymerization, or a combination thereof. Similarly, although the stacking direction is referenced as the z-direction in some embodiments, those of ordinary skill in the art would understand that the stacking direction can include any direction having a surface normal such as, for example, for printers that can print in any plane.

Since currently-available methods and systems are incapable of producing large-scale additive manufactured parts having good mechanical strength in both the stacking and printing directions, additive manufactured structures and methods for making the same can prove desirable and provide a basis for a wide range of applications, such as additive manufacturing for vehicles and/or architectural structures.

Although the structures and methods as set forth in the present disclosure are applied to solve technical problems in large-scale additive manufacturing, the structures and methods can be applied to any smaller-scale additive manufacturing, such as medium-scale and/or small-scale additive manufacturing, without limitation.

Figure 2:
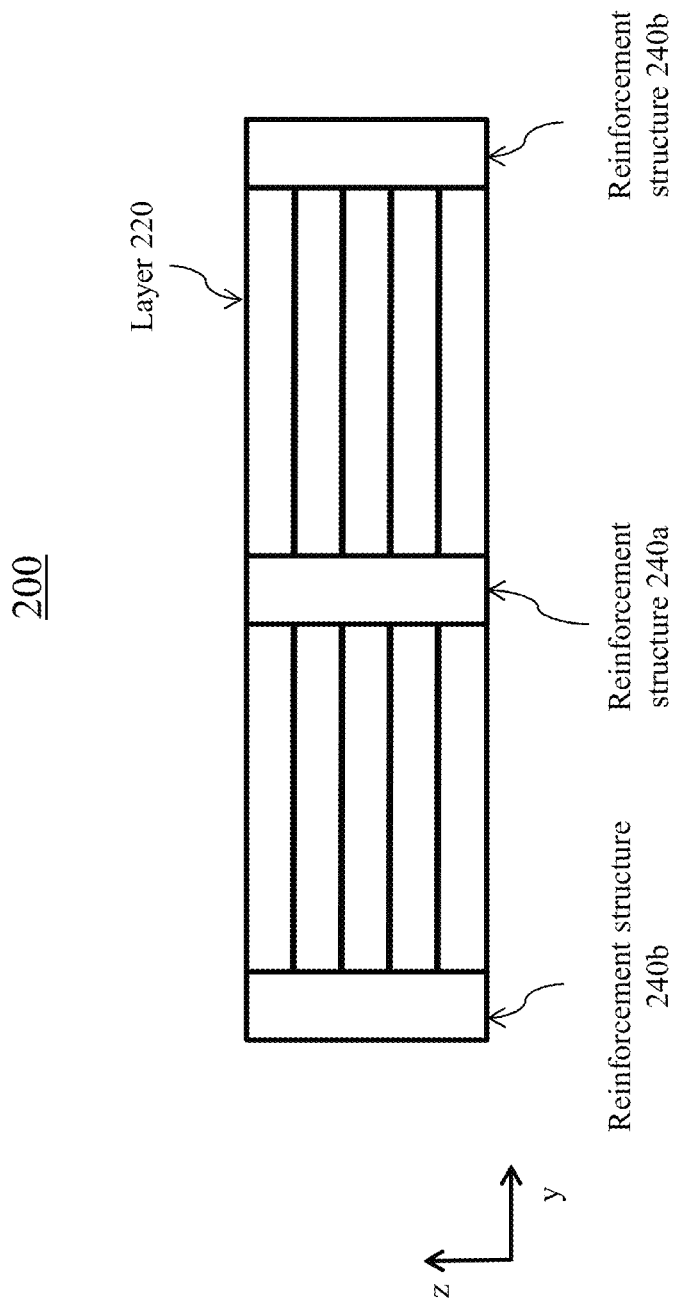
FIG. 2 is an exemplary cross-sectional diagram illustrating an embodiment of a structure that is made using the system of FIG. 1.

Turning to FIG. 2, a cross section of a structure 200 is shown. The structure 200 can include a plurality of layers 220 being stacked. At least one reinforcement structure 240 is shown as being attached to the layers 220 and aligned in the stacking direction.

Exemplary layers 220 can be made of a material including carbon fiber-filled acrylonitrile butadiene styrene (CF/ABS). For example, the CF/ABS can include discontinuous carbon fiber composite such as 20% chopped carbon fiber-filled acrylonitrile butadiene styrene (20% CF/ABS). Additionally and/or alternatively, exemplary layers 220 can be made of a material including polyamide and/or co-polyester filled with carbon fibers and/or graphene nanofillers.

Each of the reinforcement structures 240 can include a solid material that extends at least partially in the stacking direction. The reinforcement structures 240 can have any suitable geometry, for example, in a form of sheet, strip, beam, and/or tube of any suitable cross-sectional shape. The reinforcement structures 240 can be affixed to the layers 220. Stated somewhat differently, the reinforcement structures 240 can be bonded to the layers 220 such that there is substantially no relative movement between the reinforcement structures 240 and the layers 220. Advantageously, the reinforcement structures 240 can hold layers 220 together and stiffen and strengthen the structure 200.

The reinforcement structures 240 can be externally and/or internally located relative to the layers 220. As shown in FIG. 2, reinforcement structures 240a can be located within the layers 220 and attached to each of the layers 220. Additionally and/or alternatively, as shown in FIG. 2, the reinforcement structures 240b can be located outside the layers 220.

The reinforcement structures 240 can be made of any suitable material including, for example, metal, polymer, ceramic, carbon composite, glass composite, fabric, or a combination thereof. In one embodiment, the reinforcement structures 240 can have a strength that is greater than strength of the layers 220 in the printing directions and in the stacking direction. In another embodiment, the reinforcement structures 240 can have a strength that is greater than strength of the layers 220 in the in the stacking direction. In one example, the reinforcement structures 240 can have a modulus greater than the modulus of CF/ABS. In another embodiment, the reinforcement structures 240 can have a modulus lower than the modulus of CF/ABS with improved impact resistance or part containment capabilities.

An exemplary reinforcement structure 240 can include carbon fiber mat, fabric, and/or preform, for example, lay stitch. Additionally and/or alternatively, the reinforcement structures 240 can include glass fiber.

Additionally and/or alternatively, an exemplary reinforcement structure 240 can be made of a material including a metal. Stated somewhat differently, reinforcement structure 240 can include a metal structure. For example, the metal structure can include a metal sheet, strip, beam, rod, and/or tube of any suitable cross-sectional shape. The metal structure can be bonded on or into the layers 220 and be in contact with one or more of the layers 220. For example, the metal structure can include a metal square tube that is bonded into the layers 220 in the stacking direction.

Additionally and/or alternatively, an exemplary reinforcement structure 240 can be made of a material including a composite. Stated somewhat differently, the reinforcement structure 240 can include a composite structure. Exemplary composite structure can be made via a pultrusion process. For example, the composite structure can include fiber-reinforced structure of continuous cross section, such as carbon fiber I-beam, carbon fiber tube, and/or the like. Additionally and/or alternatively, the composite structure can include composite sheet, strip, beam, and/or tube of any suitable cross-sectional shape. The composite structure can be bonded on or into the layers 220 and be in contact with one or more of the layers 220. For example, the composite structure can include a composite square tube that is bonded into the layers 220 in the stacking direction. Advantageously, specific performance including, for example, stiffness to weight and strength to weight of the composite structure can be greater than specific performance of the metal structure.

One reinforcement structure 240 can be stand-alone. Stated somewhat differently, the reinforcement structure 240 can be used without being connected, coupled and/or combined with any other reinforcement structures 240. Additionally and/or alternatively, a plurality of reinforcement structures 240 made of uniform and/or different types of materials can be used in combination. In one example, the reinforcement structure 240 made of metal structure or carbon fiber can be stand-alone. In another example, the metal structure can be combined with one or more reinforcement structure 240 of a different type, such as carbon fiber. Advantageously, the metal structure can serve to hold the layers 200 together as well as provide added structure and attachment points.

Although FIG. 2 shows the reinforcement structures 240 as being aligned parallel with the stacking direction, each of the reinforcement structures 240 can be at least partially aligned with the stacking direction. Angles between each of the reinforcement structures 240 and the stacking direction can be same and/or different, without limitation.

Although FIG. 2 shows a cross section of the part in z- and y-directions, the reinforcement structures 240 can be visible and/or distributed in a cross section of the part in z- and x-directions in a uniform and/or different manner, without limitation.

Figure 3:
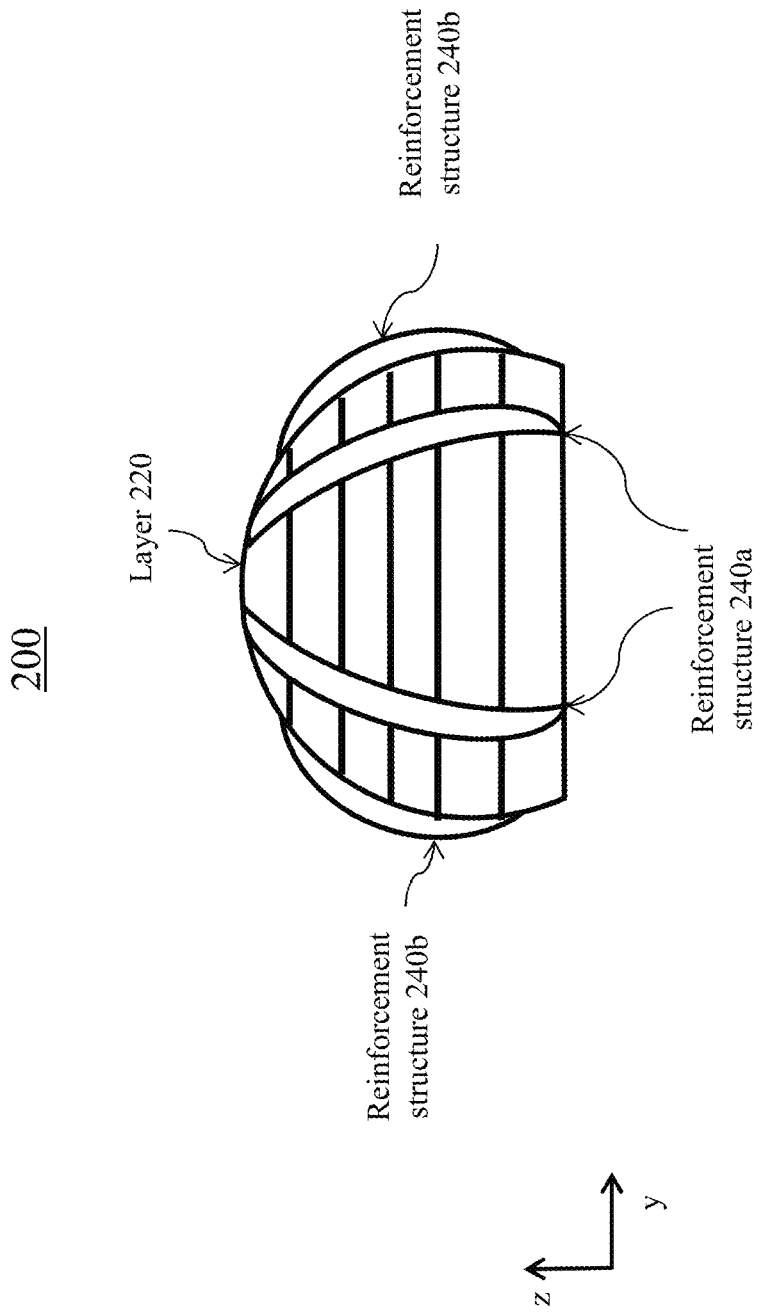
FIG. 3 is an exemplary cross-sectional diagram illustrating an alternative embodiment of the structure of FIG. 2, wherein the structure has a curved surface.

Turning to FIG. 3, at least one of the reinforcement structures 240 is shown as being structurally flexible. Stated somewhat differently, the reinforcement structures 240 can be curved, folded and/or bent. FIG. 3 shows the structure 200 as having at least one curved surface. Specifically, FIG. 3 shows the structure 200 as having a dome shape. The reinforcement structures 240 are shown as being curved. The reinforcement structures 240b can be located outside the layers 220 to conform to the curved surface of the structure 200. Stated somewhat differently, the reinforcement structures 240b can externally wrap the layers 220. Advantageously, the reinforcement structures 240b can improve bonding between the layers 220 at edges of the layers 220, even though diameter of each of the layers 220 is not uniform. In some embodiments, the reinforcement structures 240 can be flexible during application and, once bonded—for example, following vacuum resin infusion—the reinforcement structures 240 can be firm as the resin cures.

Additionally and/or alternatively, as shown in FIG. 3, each of the reinforcement structures 240a can be located inside the layers 220 and have a curved shape. A distance between the reinforcement structures 240a is shown as increasing, such that size of the layers 220 between the reinforcement structures 240a can increase with increased maximum diameters of the layers 220. Advantageously, spatial distribution of the reinforcement structures 240a, 240b can adapt to maximum diameters of the layers 220. Strengthening effect of the reinforcement structures 240a, 240b can thus be enhanced.

Figure 4:
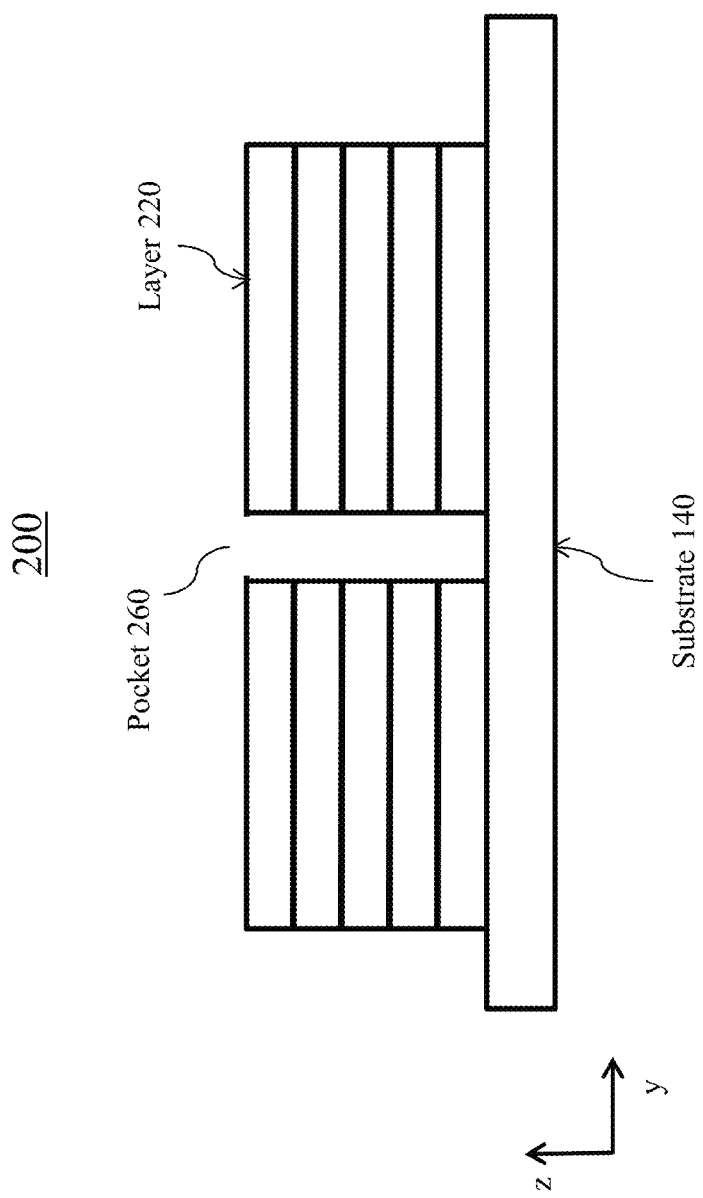
FIG. 4 is an exemplary cross-sectional diagram illustrating an embodiment of the structure of FIG. 2 during manufacturing.

Turning to FIG. 4, the structure 200 during a manufacturing process is shown. The layers 220 are shown as having been printed on the substrate 140. At least one pocket 260 is shown as being defined by the layers 220. The pocket 260 is shown as being extending and/or elongated in the stacking direction and passing through the layers 220.

Figure 7:
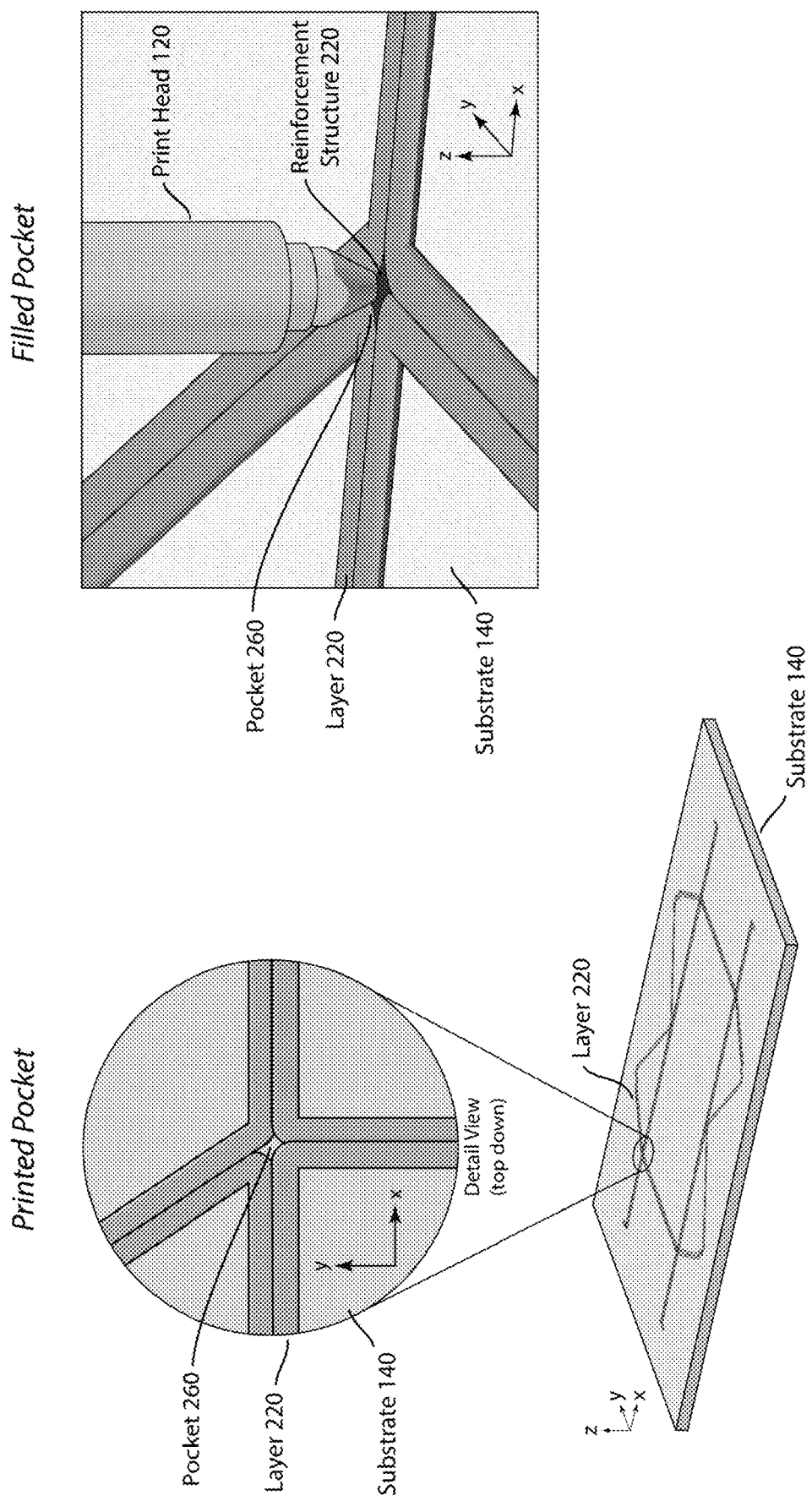
FIG. 7 is an exemplary three-dimensional perspective diagram illustrating another embodiment of the structure of FIG. 2 during manufacturing.

The location, size and/or shape of the pocket 260 can be determined based on the geometry of the structure 200. For example, the pocket 260 can comprise a cross-section with a shape shown in FIGS. 4-5. By way of another example, the pocket 260 can be defined by a four-way intersection of the layers 220, such as shown in FIG. 7. Prior to printing of the layers 220, a computerized model of the structure 200 can be formed in a manner such that the layers 220 can define the pocket 260 therein.

Figure 5:
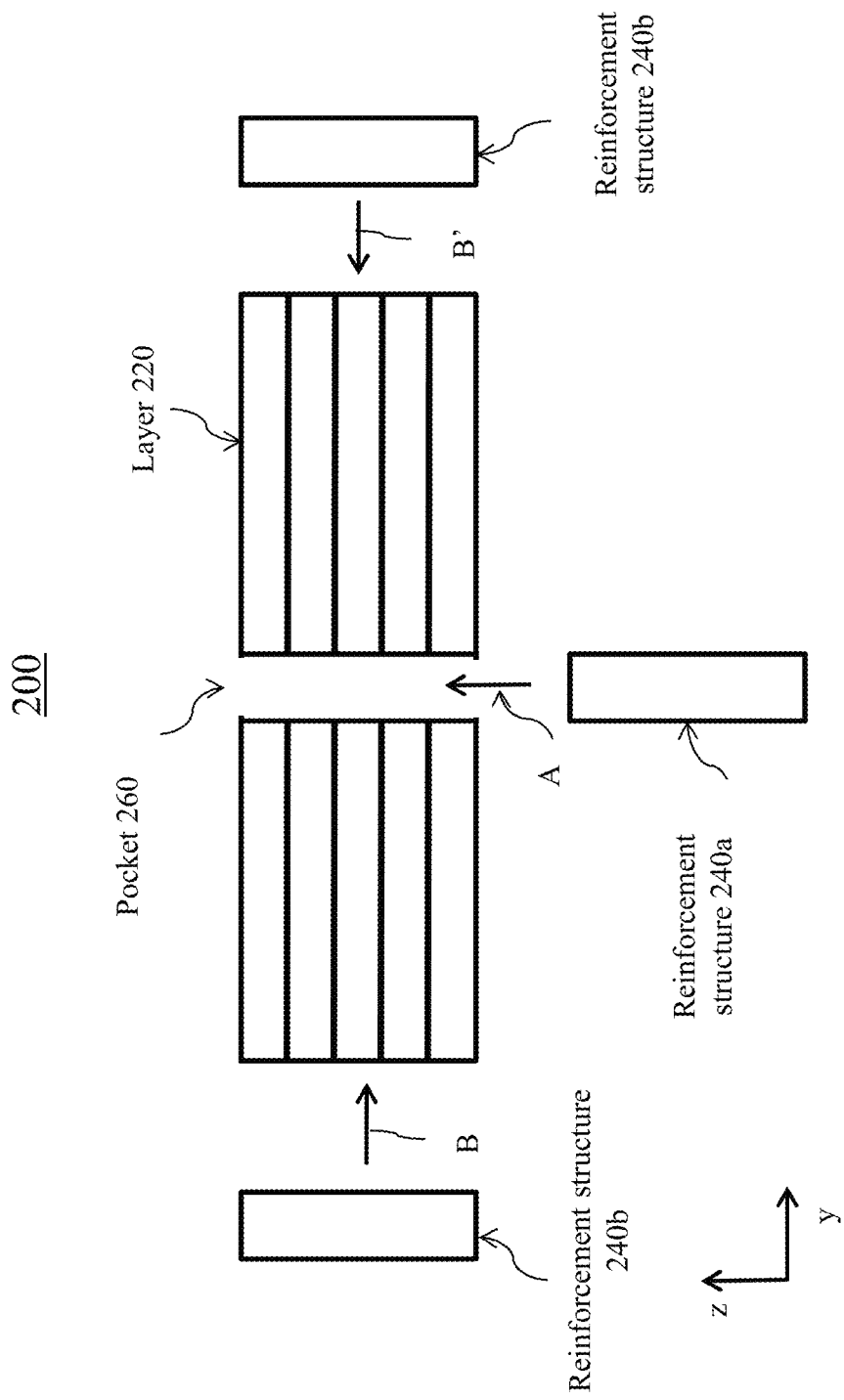
FIG. 5 is an exemplary cross-sectional diagram illustrating an alternative embodiment of the structure of FIG. 4 during manufacturing, wherein a reinforcement structure is to be positioned into a pocket in the structure.

Turning to FIG. 5, the reinforcement structure 240a is shown as being positioned into the pocket 260 in direction A. Additionally and/or alternatively, as shown FIG. 5, the reinforcement structures 240b can be positioned on the layers 220 in directions B, B'.

Each of the reinforcement structures 240 can be affixed to the layers 220 in any suitable manner. In one embodiment, the reinforcement structure 240 can be infused in-place on the layers 220. Stated somewhat differently, the reinforcement structure 240 can be placed in or on the layers 220, and an adhesive (not shown) can be introduced to penetrate into space between the reinforcement structure 240 and the layers 220.

For example, the adhesive can include a resin and infusing can be implemented via vacuum resin infusion. The reinforcing structure 240 can be placed onto the layers 220. A vacuum enclosure (or vacuum tight enclosure) can be formed around the structure 200 that includes the reinforcement structure 240 and the layers 220. The vacuum enclosure can be formed using vacuum bagging material for composite layups. Vacuum can be pulled, and the resin can be allowed to be pushed through the structure 200. The resin can be infused because of the pressure differential across the structure 200. The vacuum enclosure can be removed after the resin cures. The reinforcing structure 240 is then firmly adhered to the layers 220. Those of ordinary skill in the art will appreciate that the aforementioned vacuum resin infusion for pockets can be used in any application disclosed herein (such as with reference to FIG. 2).

Additionally and/or alternatively, the reinforcement structure 240 can be pre-cured and bonded on the layers 220. In one embodiment, an adhesive (not shown) can be applied to the layers 220 or in the pocket 260. The reinforcement structures 240 can then be positioned in the appropriate positions and be in touch with the layers 220 with the adhesive therebetween. Upon drying and/or curing of the adhesive the reinforcement structures 240 can be affixed to the layers 220.

In another embodiment, the adhesive can be applied to the reinforcement structures 240 prior to positioning of the reinforcement structures 240. The reinforcement structures 240 can then be positioned in the pocket 260. Optionally, the adhesive can be partially cured before the positioning.

The adhesive can include any suitable substance for adhering the reinforcement structures 240 to the layers 220. An exemplary adhesive can be resin-based, urethane-based, acrylate-based, or a combination thereof.

The layers 220 can be at least partially cooled to room temperature and/or solidified before the adhesive is applied to the layers 220 and/or before the reinforcement structures 240 are positioned on the layers 220. Additionally and/or alternatively, applying the adhesive to the layers 220, and/or positioning the reinforcement structures 240 in the pocket 260 or on the layers 220, can be performed during printing of the layers 220.

The reinforcement structures 240 can be affixed to the layers 220 without being stressed by any preload. The reinforcement structures 240 can hold the layers 220 together via the strength of the reinforcement structures 240, the adhesion between the reinforcement structures 240 and the layers 220, or a combination thereof. Stated somewhat differently, the reinforcement structures 240 do not necessarily apply a compression stress to the layers 220.

Figure 6:
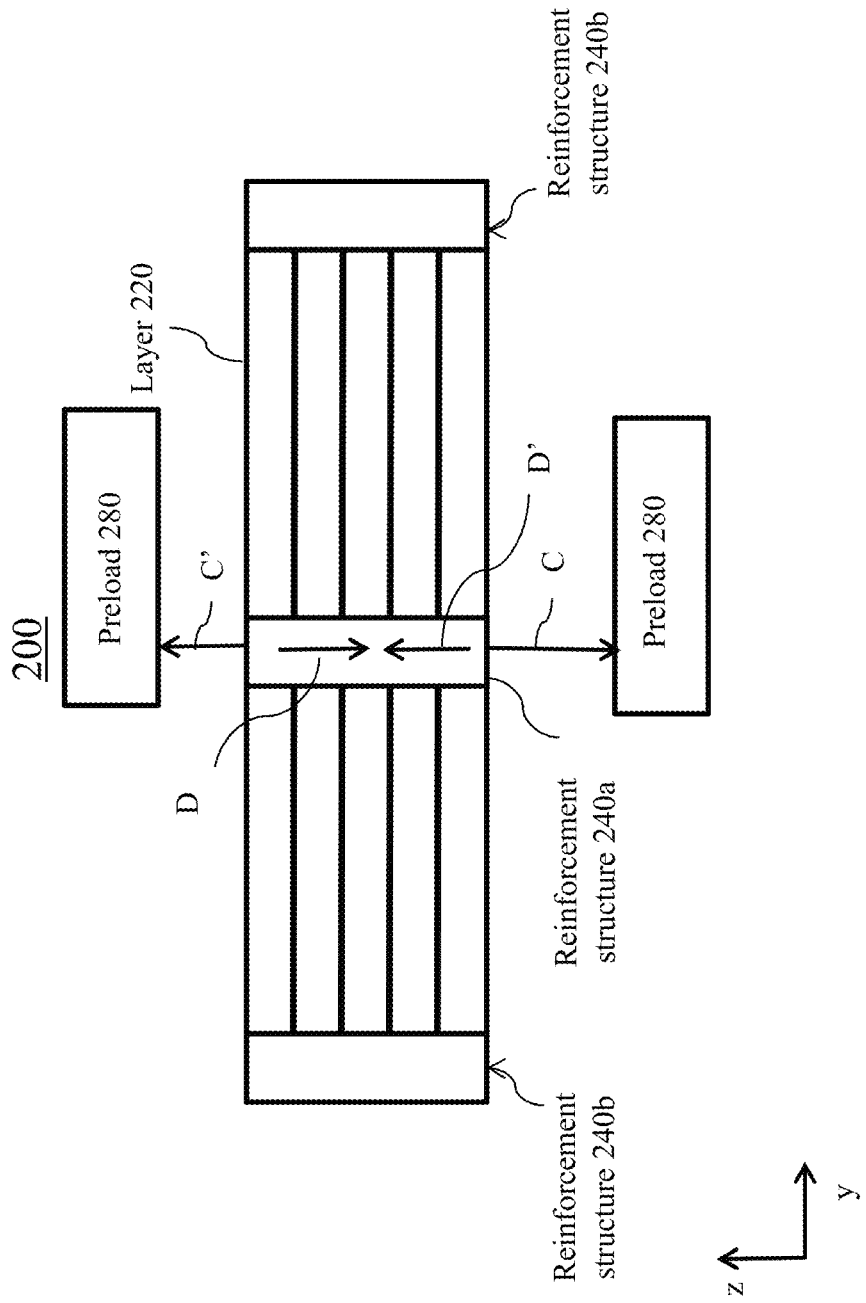
FIG. 6 is an exemplary cross-sectional diagram illustrating an alternative embodiment of the structure of FIG. 5 during manufacturing, wherein a preload is applied to the reinforcement structure.

Turning to FIG. 6, at least one preload 280 is shown as being applied to the reinforcement structure 240a in direction C, C'. The preload 280 can induce a tension in the reinforcement structure 240a.

The preload 280 can be applied to the reinforcement structure 240a in any suitable manner. In one embodiment, a tension-generating instrument can grip ends of the reinforcement structure 240a and pull with a selected force. Exemplary tension-generating instrument can be similar to and/or the same as a tensile test machine and/or a universal testing machine. Exemplary tension-generating instrument can be hydraulic powered and/or electromagnetically powered machines.

In one embodiment, the preload 280 can be applied to the reinforcement structure 240a before the reinforcement structure 240a is affixed to the layers 220. Stated somewhat differently, the preload 280 can be applied to the reinforcement structure 240a before curing and/or drying of the adhesive.

After the reinforcement structure 240a is affixed to the layers 220, the preload 280 can be removed. Removal of the preload 280 can result in a compressive stress within the reinforcement structure 240a in directions D, D' that are opposite to directions C, C' of the tension. The compression stress can thus keep the layers 220 in compression. The compressive stress can be distributed to the layers 220. Advantageously, the layers 220 can be tightly stacked, and stiffness and strength to the structure 200 can be increased.

Although FIG. 6 only shows the preload 280 as being applied to the reinforcement structure 240a, uniform and/or different preloads 280 can be applied to any of the reinforcement structures 240, without limitation. For example, uniform and/or different preloads 280 can be applied to the reinforcement structures 240b.

Turning to FIG. 7, another exemplary diagram of the pocket 260 is shown. As illustrated in FIG. 7, the pocket 260 is defined by a printed four-way intersection in the layers 220. In some embodiments, adhesive can be used without a reinforcement to fill the pocket 260 created during the printing of a layer 220, such as shown in FIG. 7.

Additionally and/or alternatively, molten thermoplastic can be used to fill the pocket 260, such as the one shown in FIG. 7.

Figure 8:
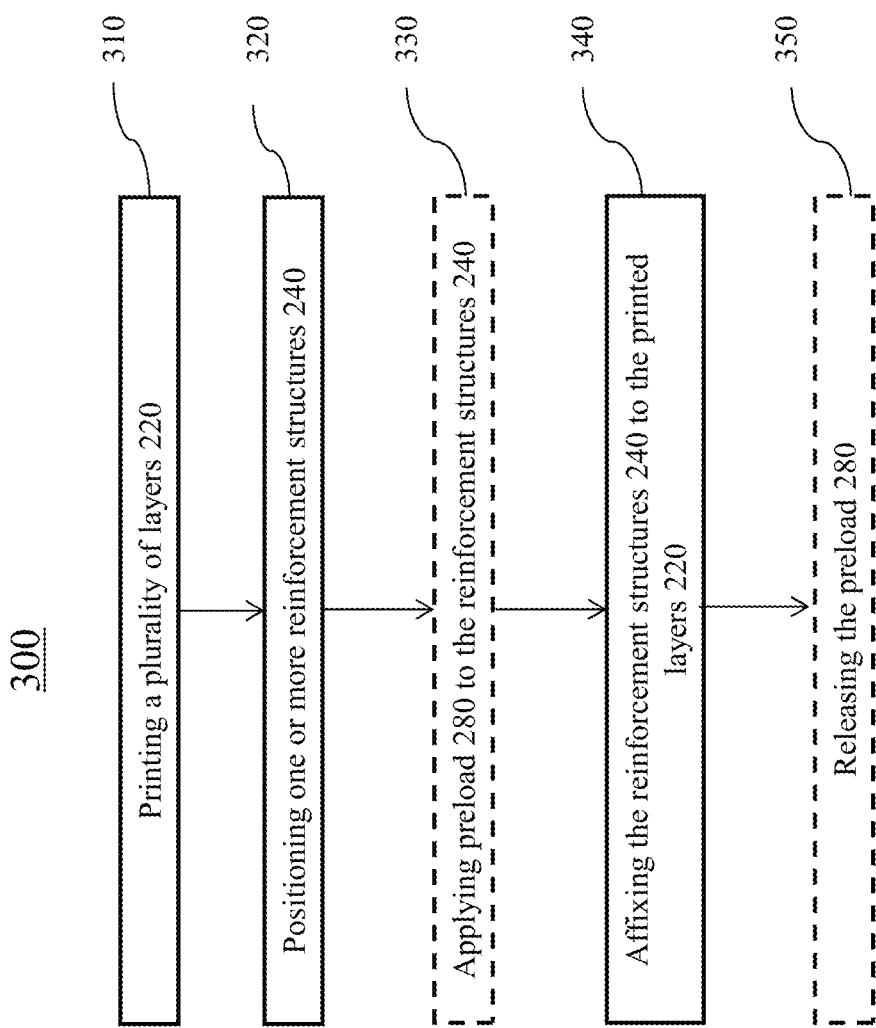
FIG. 8 is an exemplary top-level flow chart illustrating an embodiment of a method for additive manufacturing based on the system of FIG. 1.

Turning to FIG. 8, an exemplary method of manufacturing the structure 200 (shown in FIG. 2) is shown. The layers 220 are printed, at 310. The reinforcement structures 240 are positioned, at 320. For example, the reinforcement structures 240 are positioned outside the layers 220 and/or in the pocket 260 (shown in FIG. 5). The reinforcement structures 240 can be affixed, at 340, to the layers 220.

Optionally, the preload 280 is applied, at 330, to the reinforcement structures 240. The preload 280 is released, at 350.

Figure 9:
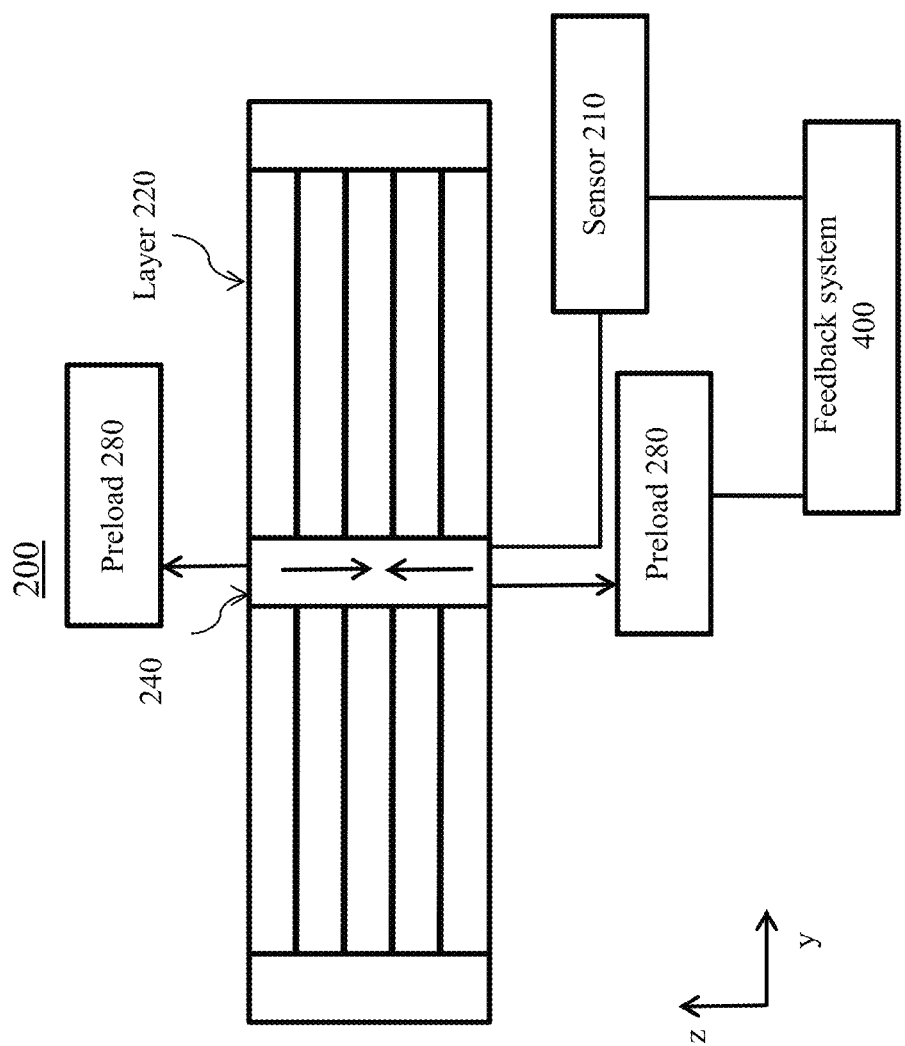
FIG. 9 is an exemplary cross-sectional diagram illustrating an alternative embodiment of the structure of FIG. 2, wherein an adjustable preload is applied to the reinforcement structure.

Turning to FIG. 9, a sensor 210 is shown as being attached to the layers 220 for measuring compressive load (not shown) in the layers 220. The sensor 210 can include any contact and/or non-contact sensors for measuring compressive load including fiber optic sensors, resistance strain gages, laser sensors, digital image correlation sensors, and so on. In one embodiment, the reinforcement structures 240 can be affixed to the layers 220 before measurement by the sensor 210. For example, after the adhesive is cured, the compressive load may need to be adjusted. Additionally and/or alternatively, after the structure 200 has been manufactured and been in use for a period of time, the usage can result in reduced compressive stress in the reinforcement structures 240 due to reasons such as material creep. The reduced compressive stress can lead to reduced holding force that the reinforcement structures 240 exert on the layers 220. Maintenance of the structure 200 can thus be implemented as shown in FIG. 9.

In one embodiment, the sensor 210 can measure the compressive load and transmit the same to an optional feedback system 400. For example, the feedback system 400 can include the tension-generating instrument (not shown), a computer system for calculating the preload 280, or a combination thereof.

The feedback system 400 can determine the preload 280 based on the compressive load. In one example, the adhesive can be re-melted. The preload 280 can be applied to the reinforcement structures 240. Thus, the resulting compressive stress in the reinforcement structures 240 can be changed. Advantageously, the preload 280 can be dynamically adjusted throughout lifetime of the structure 200. In one example, when the structure 200 is used in building a vehicle, the strength of the structure 200 can be maintained when mileage and/or lifetime of the vehicle is increased.

Although FIG. 9 shows the sensor 210 as being attached to the layers 220 for measuring the compressive load in the layers 220, the sensor 210 can additionally and/or alternatively measure the compressive load in at least one of the reinforcement structures 240.

Figure 10:
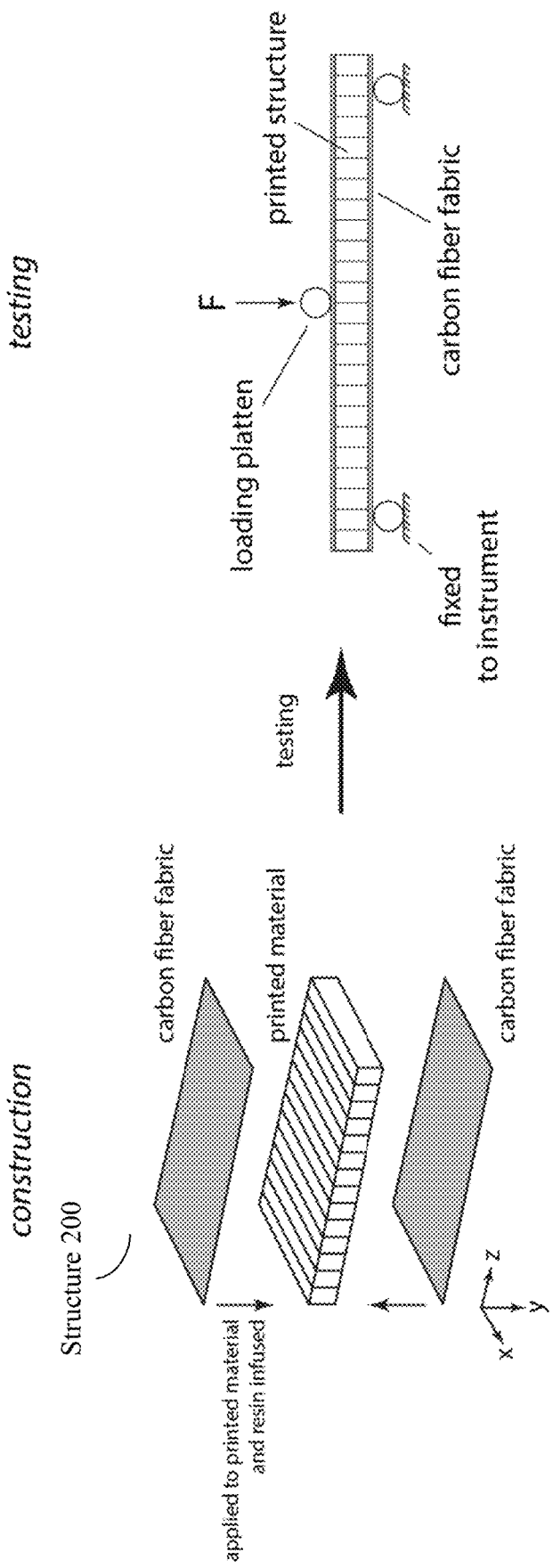
FIG. 10 is an exemplary cross-sectional diagram illustrating an alternative embodiment of the structure of FIG. 2, wherein the structure is measured in a three-point bend test.

Turning to FIG. 10, an exemplary exploded diagram of the structure 200 is shown on the left. Strength of the structure 200 can be tested in a three-point bend test according to the exemplary diagram as shown on the right in FIG. 10. A force F can be applied in a direction perpendicular to z-direction to generate a strain in the structure 200. A maximum stress for generating a strain in the structure 200 can be obtained. The maximum stress can include the greatest stress value among all stresses in the structure 200.

Figure 11:
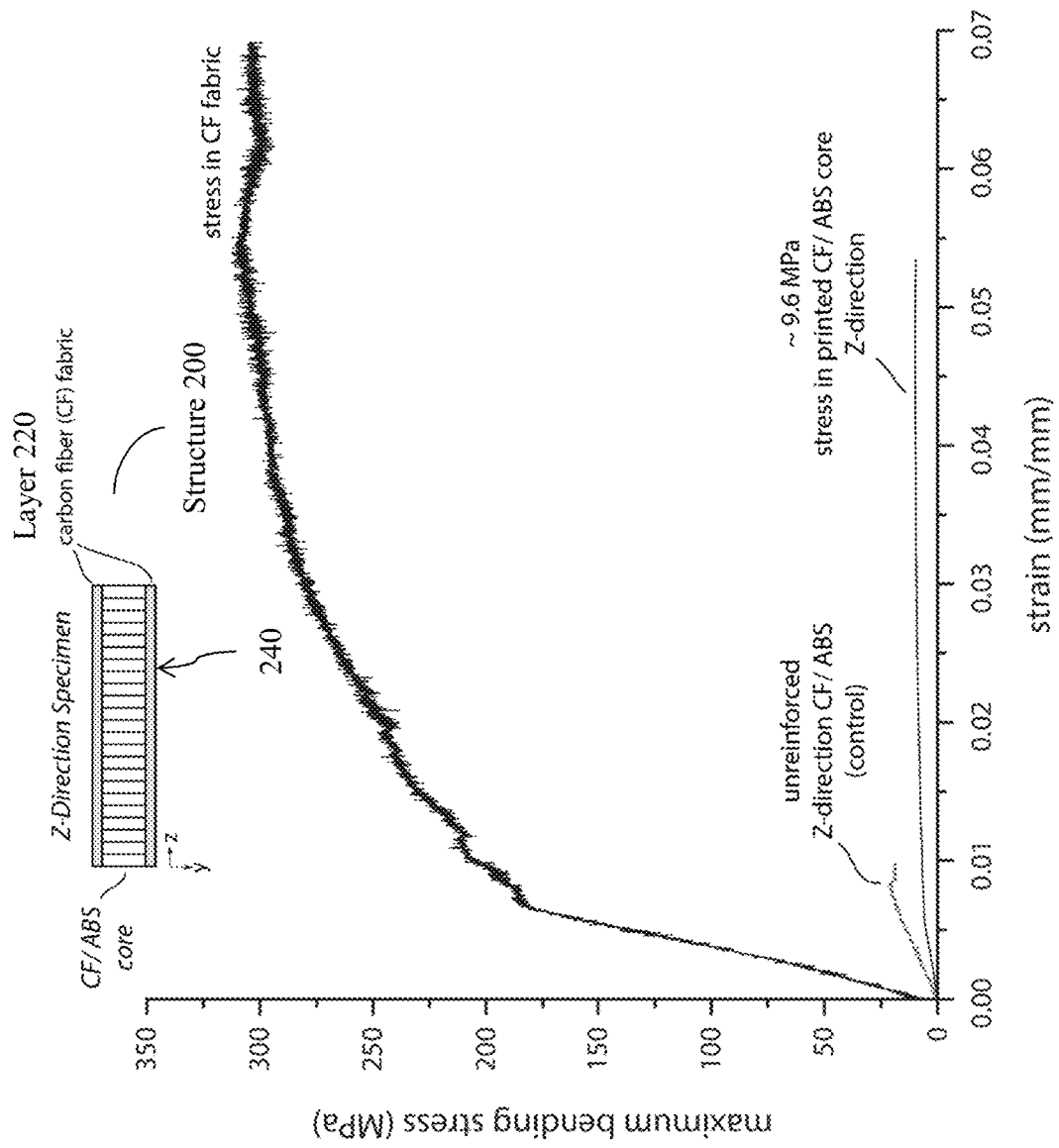
FIG. 11 is an exemplary stress-strain diagram illustrating mechanical properties of the structure of FIG. 10.

Turning to FIG. 11, the structure 200 reinforced with the reinforcement structures 240 is shown to exhibit a greater maximum stress in z-direction in comparison with control sample which is an unreinforced sample. Such improvement indicates that the reinforcement structures 240 can advantageously improve strength of the structure 200 in z-direction.

In the example shown in FIG. 11, the reinforcement structures 240 are made with a material including carbon fiber. The layers 220 are shown as being made of CF/ABS in FIG. 11.

Figure 12:
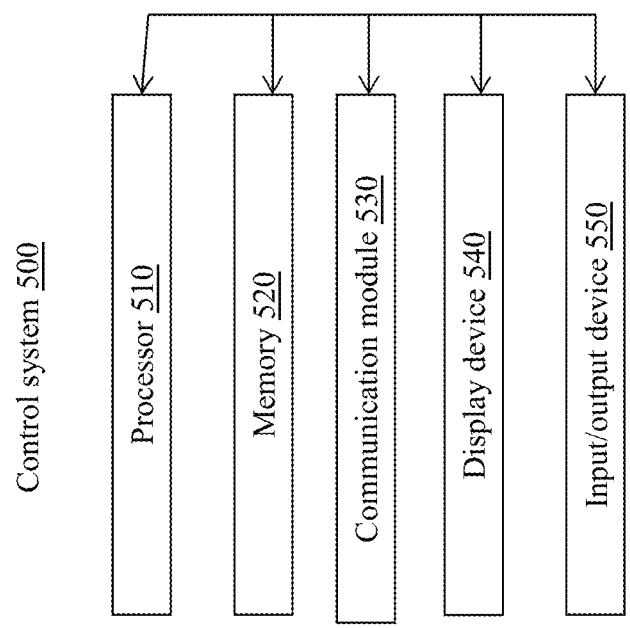
FIG. 12 is an exemplary diagram illustrating an embodiment of a control system for controlling the system of FIG. 1.

Turning to FIG. 12, a control system 500 for additive manufacturing is shown. The control system 120 can be configured for controlling the print head 120 (shown in FIG. 1). The control system 500 can include a processor 510. The processor 510 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The processor 510 can execute instructions for implementing the control system 500 and/or computerized model of the structure 200 (shown in FIG. 2). In an un-limiting example, the instructions includes one or more additive manufacturing software programs. The programs can operate to control the system 100 with multiple printing options, settings and techniques for implementing additive printing of large components.

The programs can include a computer-aided design (CAD) program to generate a 3D computer model of the structure 200. Additionally and/or alternatively, the 3D computer model can be imported from another computer system (not shown). The 3D computer model can be solid, surface or mesh file format in an industry standard.

The programs can load the 3D computer model, create a print model and generate the machine code for controlling the system 100 to print the structure 200. Exemplary programs can include LSAM Print$^{3D}$, available from Thermwood Corporation located in Dale, Ind. Additionally and/or alternatively, exemplary programs can include Unfolder Module Software, Bend Simulation Software, Laser Programming and/or Nesting Software available from Cincinnati Incorporated located in Harrison, Ohio.

As shown in FIG. 1, the control system 500 can include one or more additional hardware components as desired. Exemplary additional hardware components include, but are not limited to, a memory 520 (alternatively referred to herein as a non-transitory computer readable medium). Exemplary memory 520 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the control system 500 and/or computerized model of the structure 200 (shown in FIG. 2) can be stored on the memory 520 to be executed by the processor 510.

Additionally and/or alternatively, the control system 500 can include a communication module 530. The communication module 530 can include any conventional hardware and software that operates to exchange data and/or instruction between the control system 500 and another computer system (not shown) using any wired and/or wireless communication methods. For example, the control system 500 can receive computer-design data corresponding to the structure 200 via the communication module 530. Exemplary communication methods include, for example, radio, Wireless Fidelity (Wi-Fi), cellular, satellite, broadcasting, or a combination thereof.

Additionally and/or alternatively, the control system 500 can include a display device 540. The display device 540 can include any device that operates to presenting programming instructions for operating the control system 500 and/or presenting data related to the print head 120. Additionally and/or alternatively, the control system 500 can include one or more input/output devices 550 (for example, buttons, a keyboard, keypad, trackball), as desired.

The processor 510, the memory 520, the communication module 530, the display device 540, and/or the input/output device 550 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. An additive-manufactured structure, comprising:
   a plurality of layers stacked in a stacking direction, wherein the plurality of layers define a plurality of interfaces, each of the interfaces extending normal to the stacking direction between an adjacent pair of the layers; and
   at least one reinforcement structure affixed to the layers and extending at least partially in the stacking direction and at least from one interface of the plurality of interfaces to another interface of the plurality of interfaces.

2. The structure of claim 1, wherein the plurality of layers defines a pocket in the stacking direction and the at least one reinforcement structure extends into the defined pocket.

3. The structure of claim 2, wherein the defined pocket is filled with molten thermoplastic.

4. The structure of claim 1, wherein the plurality of layers define an outer boundary in a horizontal printing direction that is substantially perpendicular to the stacking direction, and the reinforcement structure is disposed outside of the outer boundary of the plurality of layers.

5. The structure of claim 1, wherein the plurality of layers defines an outer boundary in a horizontal printing direction that is perpendicular to the stacking direction, and the reinforcement structure is disposed within the outer boundary of the plurality of layers.

6. The structure of claim 1, further comprising a preload removably coupled to one end of the at least one reinforcement structure that introduces a tension in the at least one reinforcement structure.

7. The structure of claim 1, wherein the at least one reinforcement structure is bonded to the plurality of the layers using at least one of a resin-based adhesive, a urethane-based adhesive, and an acrylate-based adhesive.

8. The structure of claim 1, further comprising a sensor removably coupled to the plurality of layers for measuring a compressive load within the plurality of layers.

9. The structure of claim 1, wherein the at least one reinforcement structure is structurally flexible.

10. The structure of claim 1, wherein a selected layer of the plurality of layers comprises at least one of a carbon fiber-filled acrylonitrile butadiene styrene layer, a polyamide layer, and a co-polyester filled with carbon fibers or graphene nanofillers layer.

11. The structure of claim 1, wherein the at least one reinforcement structure comprises a material selected from at least one of a polymer, a carbon composite, a glass composite, metal, ceramic, and a fabric.

12. The structure of claim 1, wherein at least one dimension of the additive-manufactured structure is greater than five feet in length.

13. A method for printing an additive-manufactured structure, the method comprising:
 additively-printing one or more layers onto a substrate to form a body structure, wherein each of the additively-printed layers are printed as subsequent layers in a stacking direction, and wherein the body structure defines a pocket extending in the stacking direction and surrounded by at least some of the one or more layers;
 after forming the body structure, positioning at least one reinforcement structure within the pocket defined by the body structure, wherein the at least one reinforcement structure extends at least partially in the stacking direction and at least from one interface of the plurality of layers to another interface of the plurality of layers; and
 affixing the at least one reinforcement structure to one or more of the layers.

14. The method of claim 13, further comprising applying a preload to the at least one reinforcement structure.

15. The method of claim 14, wherein the additively-printing the plurality of layers onto the substrate creates an additive-manufactured structure that is greater than five feet in length in at least one dimension.

16. The method of claim 13, wherein the pocket includes a four-way intersection of the printed layers.

17. The method of claim 13, wherein said affixing the at least one reinforcement structure to the plurality of layers comprises applying an adhesive.

18. The method of claim 17, wherein said affixing includes applying the adhesive prior to said positioning the at least one reinforcement structure.

19. The method of claim 13, further comprising receiving a computer aided design file, and wherein said additively-printing the plurality of layers onto the substrate is based on the received computer aided design file.

\* \* \* \* \*